(12) United States Patent
Ford et al.

(10) Patent No.: US 6,846,005 B2
(45) Date of Patent: Jan. 25, 2005

(54) AIR BAG CUSHION AND MODULE

(75) Inventors: Brian Ford, Mt. Clemens, MI (US); Mary Grondin, Attica, MI (US); Lawrence R. Langbeen, Attica, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 157 days.

(21) Appl. No.: 10/314,815

(22) Filed: Dec. 9, 2002

(65) Prior Publication Data

US 2004/0108699 A1 Jun. 10, 2004

(51) Int. Cl.7 .............................................. B60R 21/16
(52) U.S. Cl. ............................... 280/728.2; 280/743.1; 280/743.2
(58) Field of Search .......................... 280/728.1, 728.2, 280/740, 741, 743, 743.2

(56) References Cited

U.S. PATENT DOCUMENTS

| | | | |
|---|---|---|---|
| 5,149,130 A | * 9/1992 | Wooley et al. | 280/743.1 |
| 5,468,012 A | 11/1995 | Mihm | |
| 5,516,146 A | 5/1996 | Kopitzke | |
| 5,632,506 A | * 5/1997 | Shellabarger | 280/743.1 |
| 5,853,191 A | * 12/1998 | Lachat | 280/730.2 |
| 6,283,499 B1 | 9/2001 | Nelsen et al. | |
| 6,523,855 B2 | 2/2003 | Musiol et al. | |
| 6,669,226 B2 | * 12/2003 | Fowler et al. | 280/728.2 |

* cited by examiner

Primary Examiner—Paul N. Dickson
Assistant Examiner—Toan C To
(74) Attorney, Agent, or Firm—Lonnie Drayer; Jarrett Rieger

(57) ABSTRACT

An air bag module comprises an air bag inflator and an air bag inflatable by the air bag inflator. The air bag has a hole to receive the air bag inflator and at least one tab attached to the air bag near the hole to assist in the insertion of the air bag inflator into air bag. The air bag has a heat shield near the air bag inflator.

11 Claims, 11 Drawing Sheets

AIR BAG CUSHION AND MODULE

BACKGROUND OF THE INVENTION

This invention relates to an air bag module for a passenger side air bag.

An air bag module typically comprises an air bag, an air bag inflator, and a mechanism for initiating the inflation of the air bag. An air bag located on the passenger side of the vehicle may require the air bag inflator to be placed inside the air bag. The air bag may have an insertion hole sized to receive one end of the air bag inflator, which is inserted into this hole during assembly.

A tight fit between the hole of air bag and the air bag inflator is desirable to ensure that gas exhausted from the air bag inflator during deployment is retained within the air bag. Thus, the insertion hole is generally sized to leave very little gap between the air bag inflator and the air bag to promote a good seal between air bag and inflator. As a consequence, this tight fit makes the insertion of the air bag inflator into the air bag difficult. The air bag has a tendency to bunch up around the inflator during assembly.

In addition, during deployment of the air bag, the air bag may slide along the length of the air bag. It is thus necessary to secure the air bag inflator to the air bag to ensure proper deployment of the air bag. An air bag inflator, however, may not have an attachment feature that permits the air bag to be secured to the inflator.

Finally, an air bag inflator has gas ports in some cases configured around one of its ends. These gas ports vent very hot gas into the air bag during deployment. Accordingly, the seams and cushion fabric of the air bag must be protected from the heat of the gas generated by the air bag inflator.

A need therefore exists for a simple air bag module design for a passenger side air bag that may easily accommodate an air bag inflator while still securing the air bag inflator to the air bag and protecting the air bag against hot gases from the inflator.

SUMMARY OF THE INVENTION

The inventive air bag module comprises an air bag inflator and an air bag. Like existing air bag modules, the air bag has a neck to receive the air bag inflator. In contrast to existing modules, however, the inventive air bag module has a pull tab attached to the air bag that permits the air bag to be held in place while the air bag inflator is inserted. This feature greatly reduces the effort needed to insert the air bag inflator into the air bag during assembly.

The air bag neck may have a first hole and a second hole. Each hole is sized to receive at least a portion of the air bag inflator. The air bag inflator may be inserted through one of the holes so each end of the air bag inflator protrudes out of each respective hole of the air bag. In this way, the respective ends of the air bag inflator may be nested within the two holes and the sides of the neck of the air bag while the length of the inflator is in contact with the air bag.

Each hole may have a tab located nearby, which may be used to adjust the air bag relative to the air bag inflator. The tabs may also have holes that match the size of the inflator insertion holes located near them. The tabs of the air bag may be folded over the ends of the air bag inflator permitting the tab holes to help secure the air bag inflator to the air bag.

The air bag may have a heat shield. This heat shield may comprise heat resistant fabric sewn to the panels of the air bag, such as its main panel and side panels. Preferably, the heat shield is secured over the seams of the air bag to ensure that hot gases from the air bag inflator remain within the air bag and do not burn its seams and other areas of the air bag. In addition, a heat shield may comprise a plurality of layers of fabric sewn to the panel and to the side panels.

The inventive air bag is assembled by holding a tab of the air bag while the air bag inflator is inserted into a hole in the air bag. The tab thus ensures that the air bag does not bunch around one end of the air bag inflator. Once the inflator is inserted into the air bag, the tabs are folded over the air bag and used to secure the air bag inflator to the air bag, helping to prevent the air bag from moving relative to the air bag inflator during assembly of the air bag as well as during deployment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE INVENTION

Figure 1:
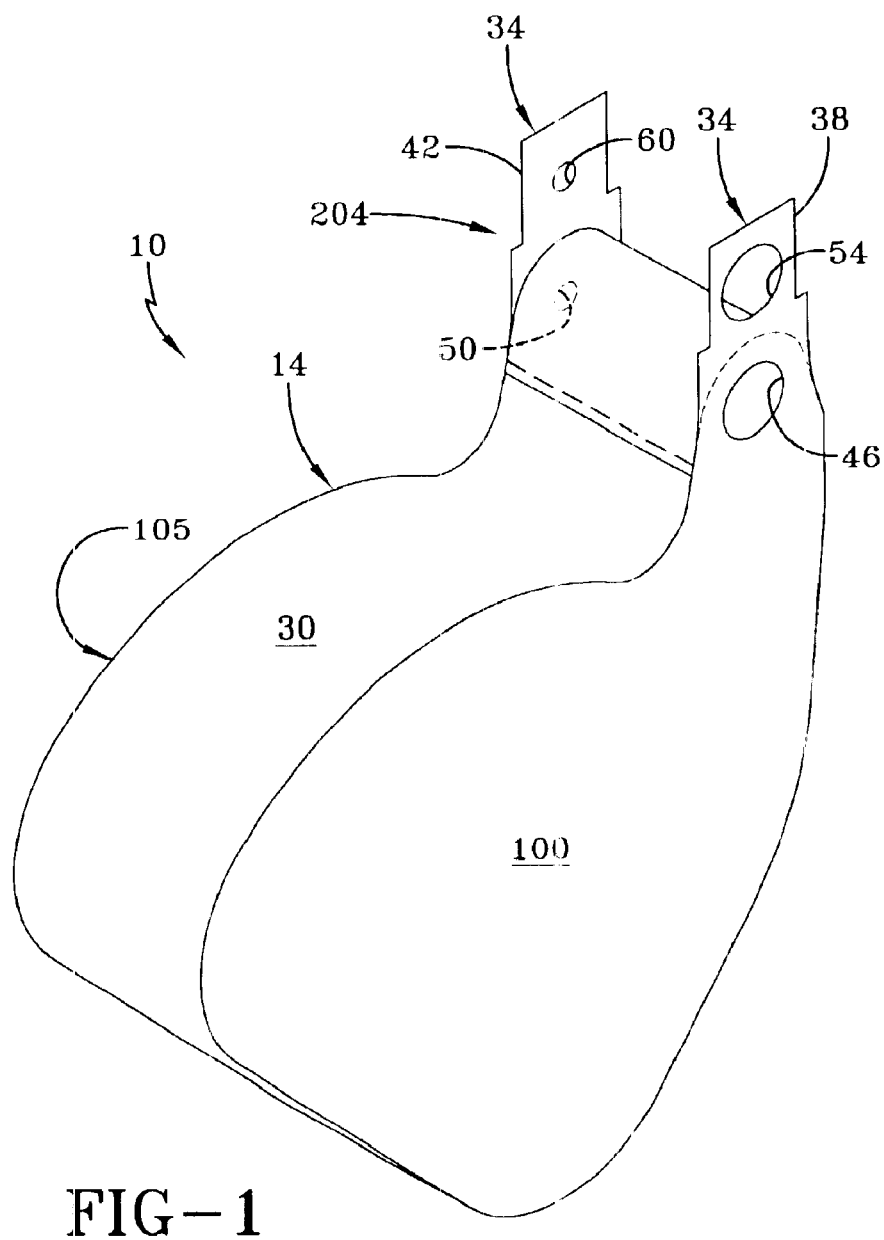
FIG. 1 illustrates an air bag of the inventive air bag module, highlighting tabs attached to the air bag.
Figure 2:
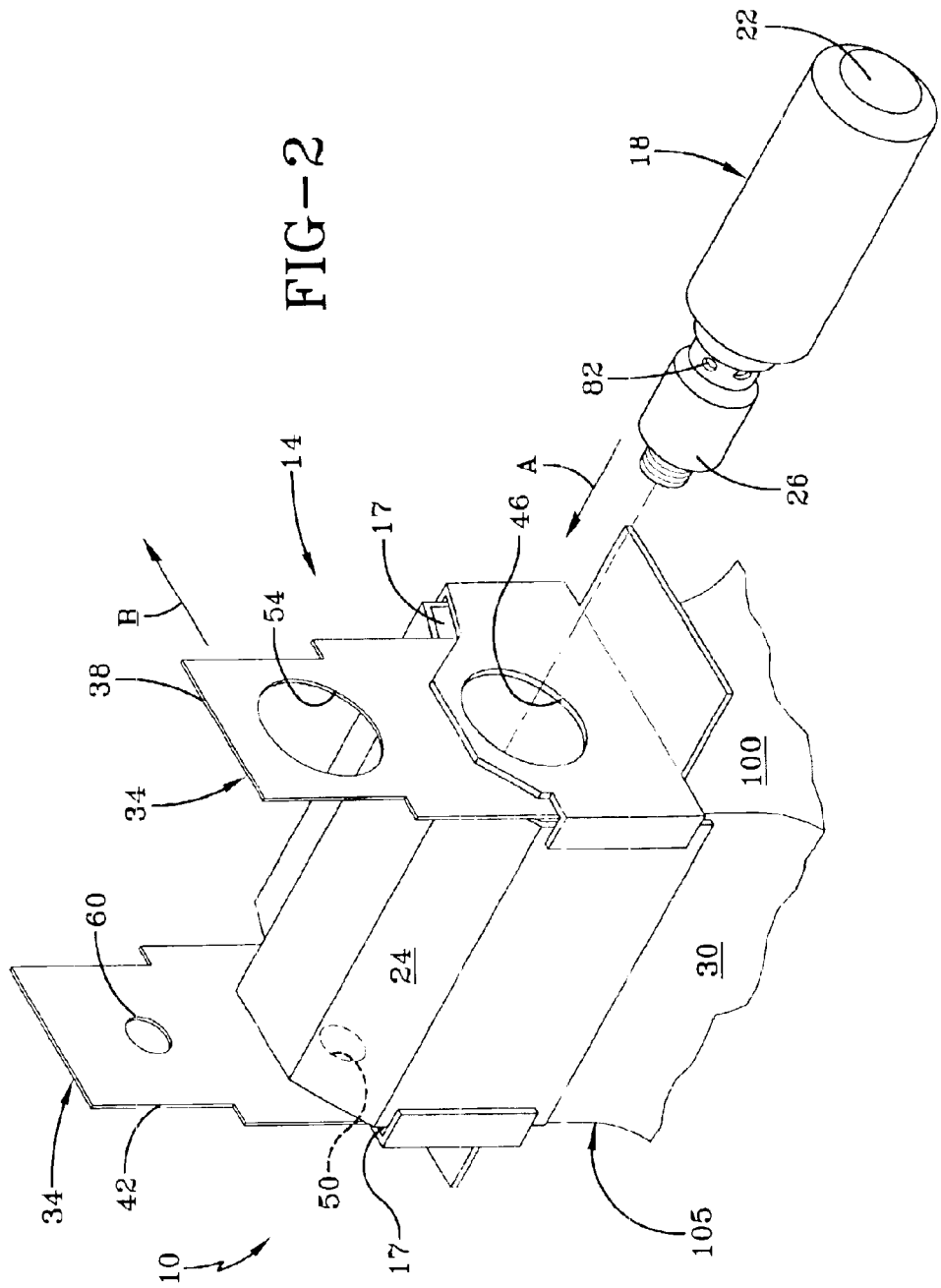
FIG. 2 illustrates the inventive air bag module, including air bag inflator prior to its insertion into air bag.

FIGS. 1 and 2 illustrate the inventive air bag module 10. Referring to FIG. 1, air bag 14 is made of known typically woven fabric and may comprise several panels of fabric that are sewn together. Air bag 14 may be made with three panels, side panel 100, main panel 30, and side panel 105. Each side panel 100, 105 may be stitched to main panel 30. Main panel 30 (see FIG. 1), which in addition to providing volume to the cushion, covers air bag inflator 18 to be inserted in air bag 14 (see FIG. 2). These features of air bag 14 are known.

In contrast to existing air bags and air bag modules, air bag 14 has projections 34, here first tab 38 and second tab 42, which form a portion of each side panel 100, 105. While tabs 38 and 42 are shown here as part of side panels 100, 105, tabs may instead be formed on main panel 30. First tab 38 is a protrusion and part of the inboard side panel 100. Second tab 42 is a protrusion and part of the outboard side panel 105. Preferably, first tab 38 is located near first hole 46 while second tab 42 is located near second hole 50. As will be explained, it is also preferable that first tab 38 have third hole 54 to match the size of first hole 46 and second tab have fourth hole 60 sized to match second hole 50.

FIG. 2 shows air bag 14 as well as housing 24 and air bag inflator 18. Here, projections 34, i.e., first tab 38 and second tab 42, are pulled through slots 17 of housing 24 to extend outside of housing 24. Housing 24 may comprise steel and have two holes to match the size of first hole 46 and second hole 50. Housing 24 serves to protect air bag 14 and inflator 18.

Tabs 38 and 42 permit the easy installation of air bag inflator 18 into air bag 14. As shown in FIG. 2, air bag inflator 18 having first end 22 and second end 26 is inserted into first hole 46 of air bag 14 along the direction of arrow A. As air bag inflator 18 is slid into cushion 14, first tab 38 may be held in place by applying a force along the direction of arrow B to prevent the movement of first hole 46 and cushion 14. First tab 38 further helps slide air bag 14 and first hole 46 along air bag inflator 18 during its insertion to prevent bunching of the air bag 14 around air bag inflator 18. Second tab 42 may be used to adjust air bag 14 and second hole 50 around air bag inflator 18 as well.

Figure 3:
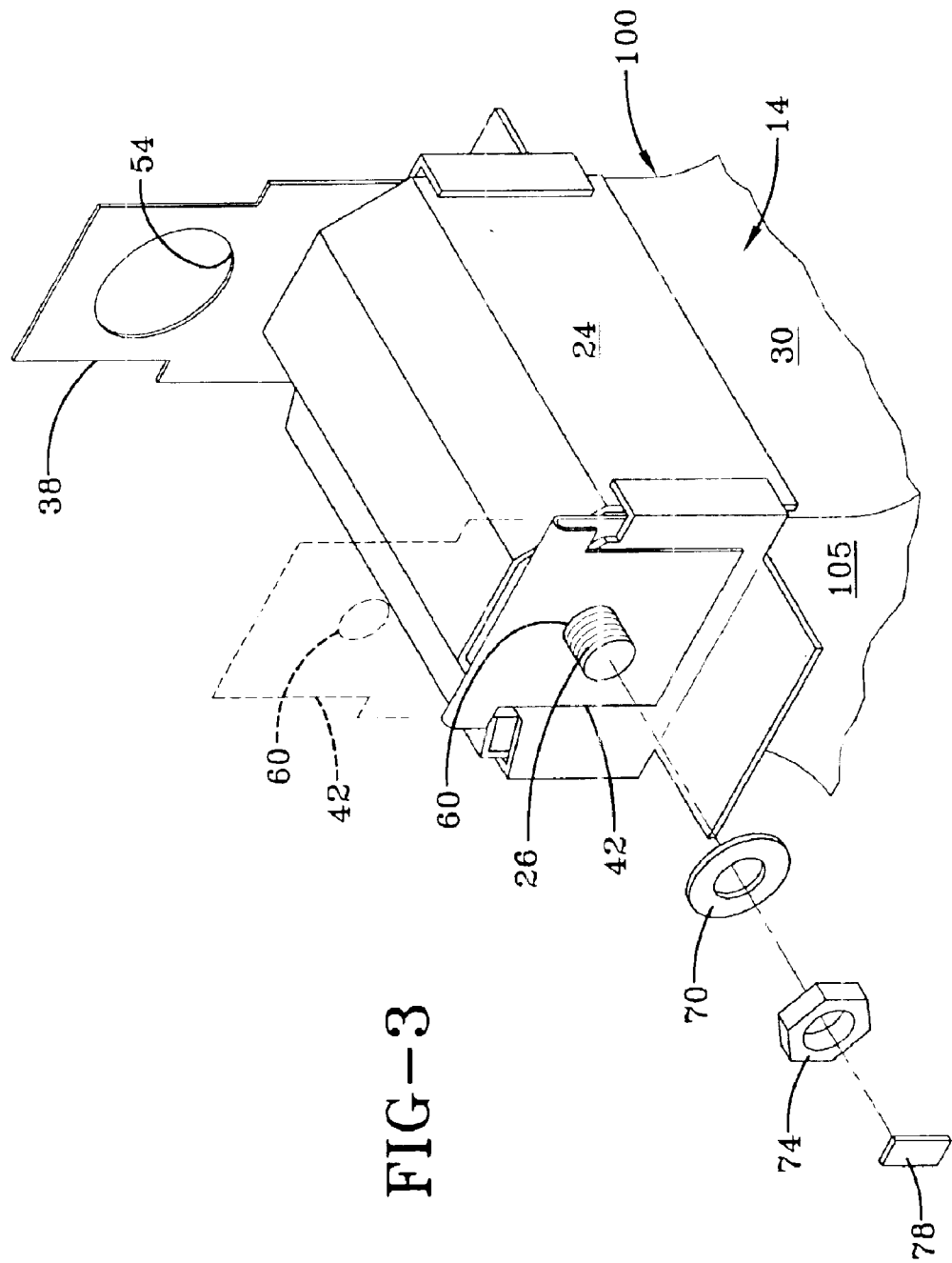
FIG. 3 shows the inventive air bag module of FIGS. 1 and 2 with air bag inflator inserted into air bag.
Figure 4:
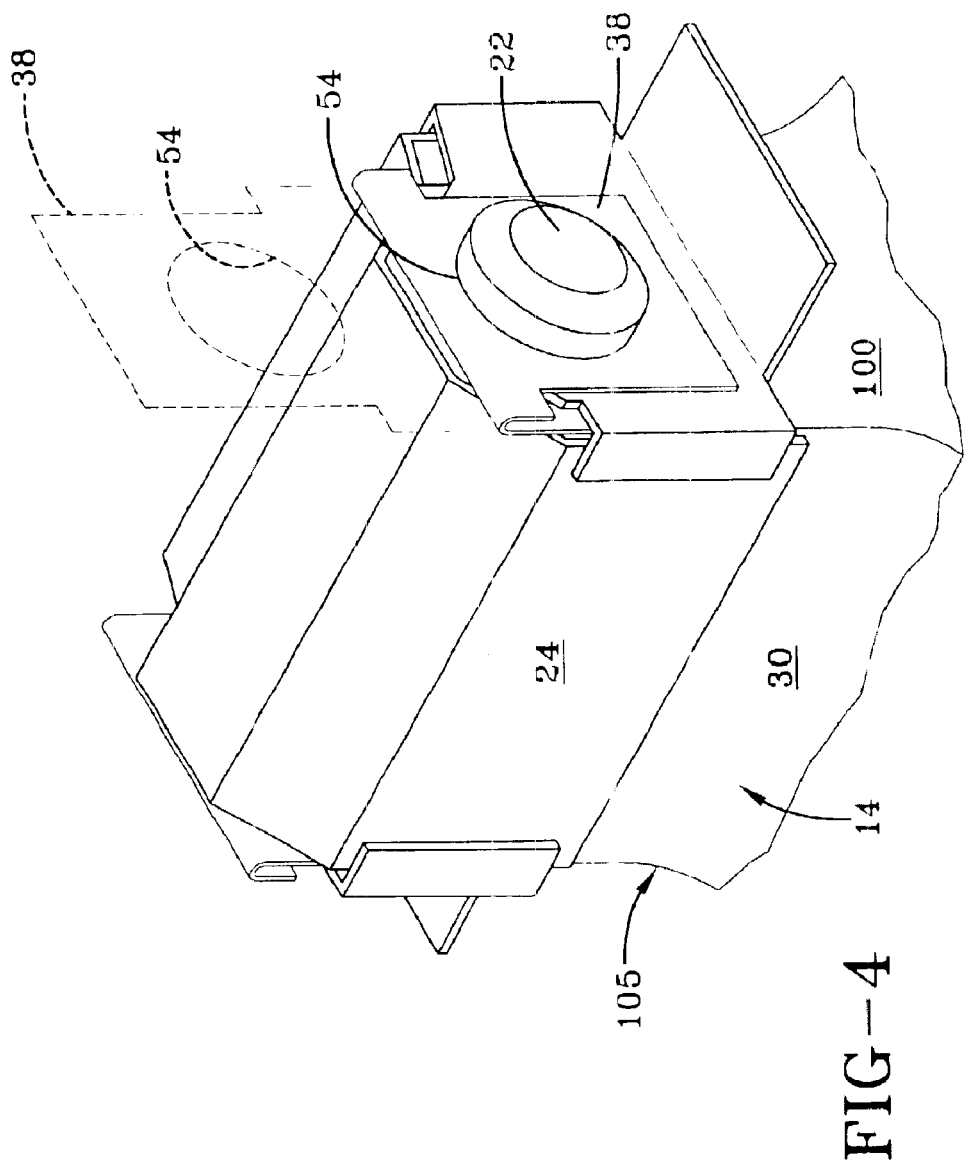
FIG. 4 illustrates an alternative view of the inventive air bag module with air bag inflator inserted.

FIGS. 3 and 4 illustrate another novel aspect of air bag module 10. These figures illustrate how tabs 38 and 42 may be folded over the ends of air bag inflator 18 to secure air bag 14 to air bag inflator 18. In FIG. 3, air bag inflator 18 is within housing 24 and main panel 30 and between side panel 100 and side panel 105. Second end 26, here a threaded end, is inserted into air bag 14 through first hole 46 to pass through second hole 50. Second tab 42 is then folded over second end 26 such that fourth hole 60 passes over and encircles second end 26. Because second hole 26 and fourth hole 60 pass over the same end of air bag inflator 18, second hole 26 and fourth hole 60 will be matched in size to fit snuggly around second end 26. By folding over second tab 42 of air bag 14 over second end 26, second end 26 of air bag inflator 18 is secured to air bag 14 through fourth hole 60. In addition, washer 70 and nut 74 further secure air bag inflator 18 to air bag 14 and housing 24 and further prevent side panel 105 from sliding along the direction of arrow B to uncover gas exit ports 82. Electrical connector 78 may be attached to second end 26, as known, to provide a contact for igniting air bag inflator 18.

As shown in FIG. 4, first tab 38 may be folded over first end 22 of air bag inflator 18, which is inserted into air bag 14 and housing 24. Again, first tab 38 may have third hole 54, which may encircle and secure first end 22 to air bag 14. Again, because third hole 54 secures the same end of air bag inflator 18, first end 22, as first hole 46, both third hole 54 and first hole 46 are matched in size to fit securely around this end. In this way, air bag inflator 18 may be held to air bag 14 without any attachment feature, ensuring proper air bag 14 deployment.

Figure 5:
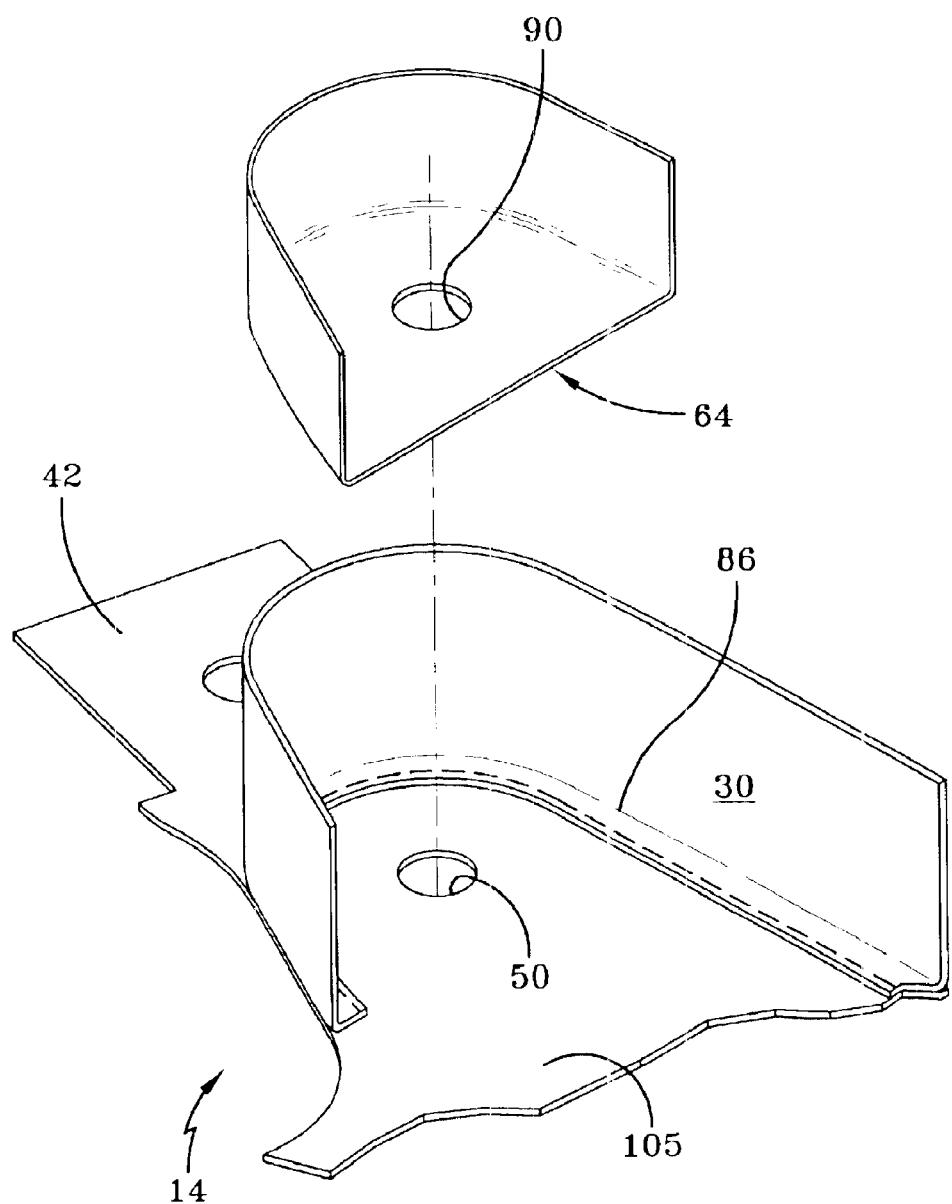
FIG. 5 illustrates heat shield of inventive air bag module.

FIG. 5 illustrates another important feature of air bag module 10. Air bag inflator 18 has gas ports 82 (shown in FIG. 2), which exhaust hot gas. This hot gas may burn the fabric of an air bag as well as the threads of the air bag that form the seams between panels of the air bag. To prevent damage to air bag 14 and any potential leakage of gas from air bag 14, air bag 14 has heat shield 64, which may be inserted into main panel 30 over seam 86 near second hole 50 near the anticipated location of gas ports 82 within air bag cushion 14. Heat shield 64 may comprise fabric, such as the fabric used for air bag 14, or fabric coated with a heat absorbing material such as silicone, that is folded over and sewn to main panel 30. Heat shield 64 may have fifth hole 90 sized to match the size of hole 50 to permit second end 26 to pass through. Heat shield 64 provides an inexpensive way to guard against damage to air bag 14 and the inadvertent leakage of gas outside of air bag 14.

Figure 6A:
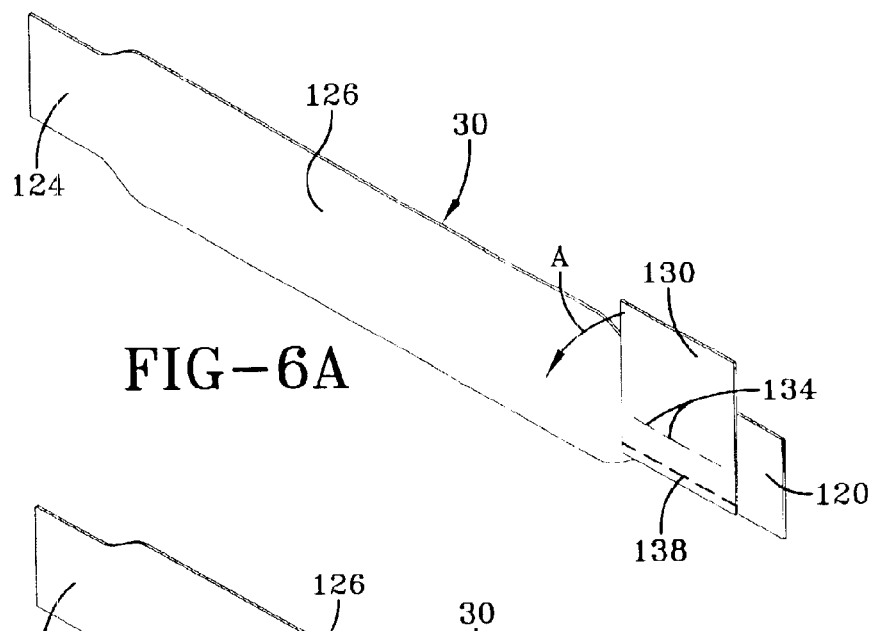
FIGS. 6A–6C illustrates an installation of an alternative design of a heat shield to be employed with the inventive air bag module.
Figure 6B:
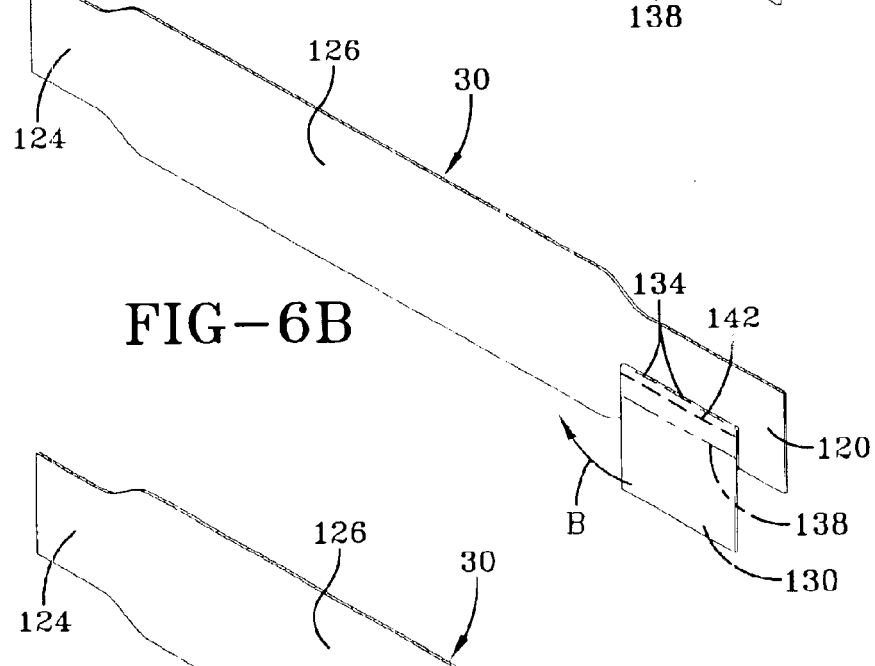
Figure 6C:
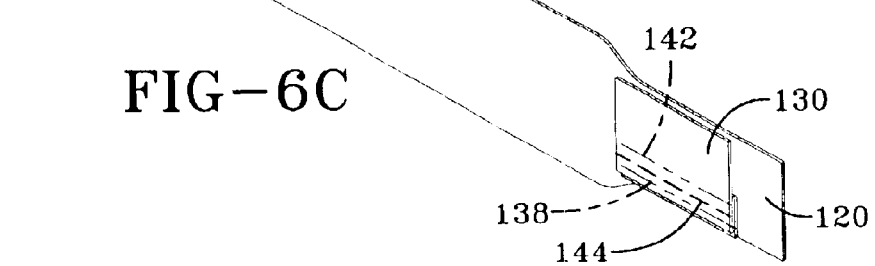
Figure 7A:
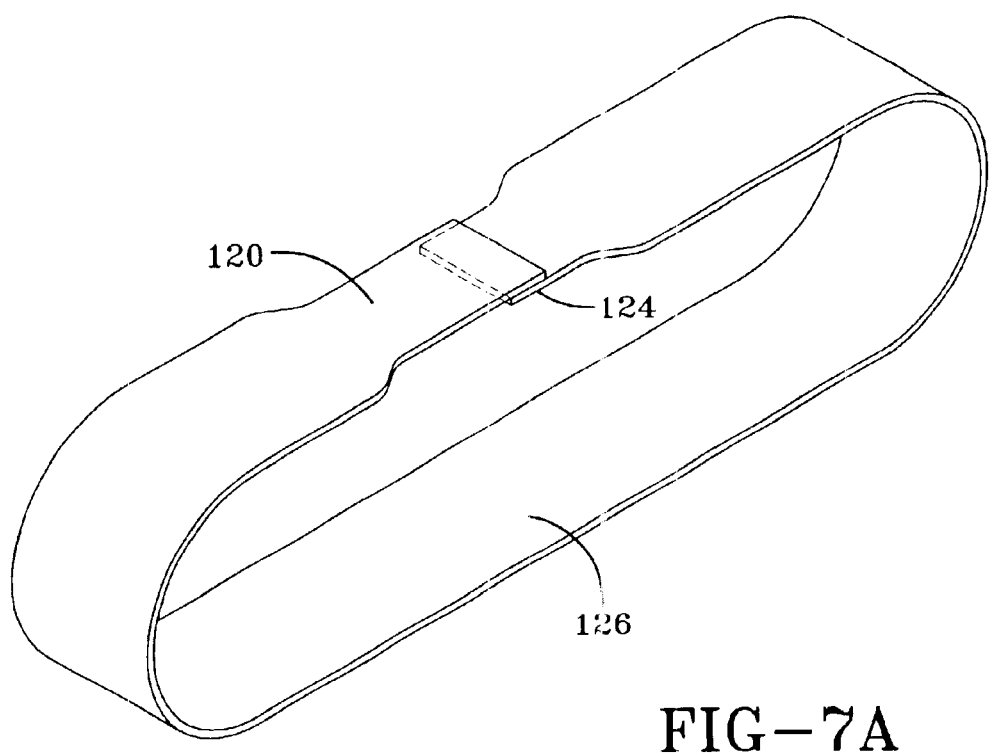
FIG. 7A illustrates a further step in the installation of the heat shield of FIGS. 6A–6C.

FIGS. 6A–6C illustrate another heat shield 130 to be used with the inventive air bag module. Main panel 30 is shown prior to its attachment to side panels 100 and 105. Main panel 30 has first neck 120 and second neck 124, both portions narrower than body 126 of main panel 30. First neck 120 is longer than second neck 124 so that ultimately first neck 120 may be stitched over second neck 124 as shown in FIG. 7A to form main panel 30 into a loop to which side panels 100 and 105 are stitched. As shown in FIG. 6A, heat shield 130 is sewn at stitch line 138 to first neck 120. Heat shield 130 comprises a rectangular shaped fabric treated with a heat resistant material such as silicone or neoprene. Heat shield 130 is folded down in the direction of arrow A over itself, creating another shielding insulation layer. To assist in folding of heat shield 130, slits 134 are provided through heat shield 130 to allow fabric to fold more easily and lay flat. Slits 134 are located where folds lines are to be made.

Figure 7B:
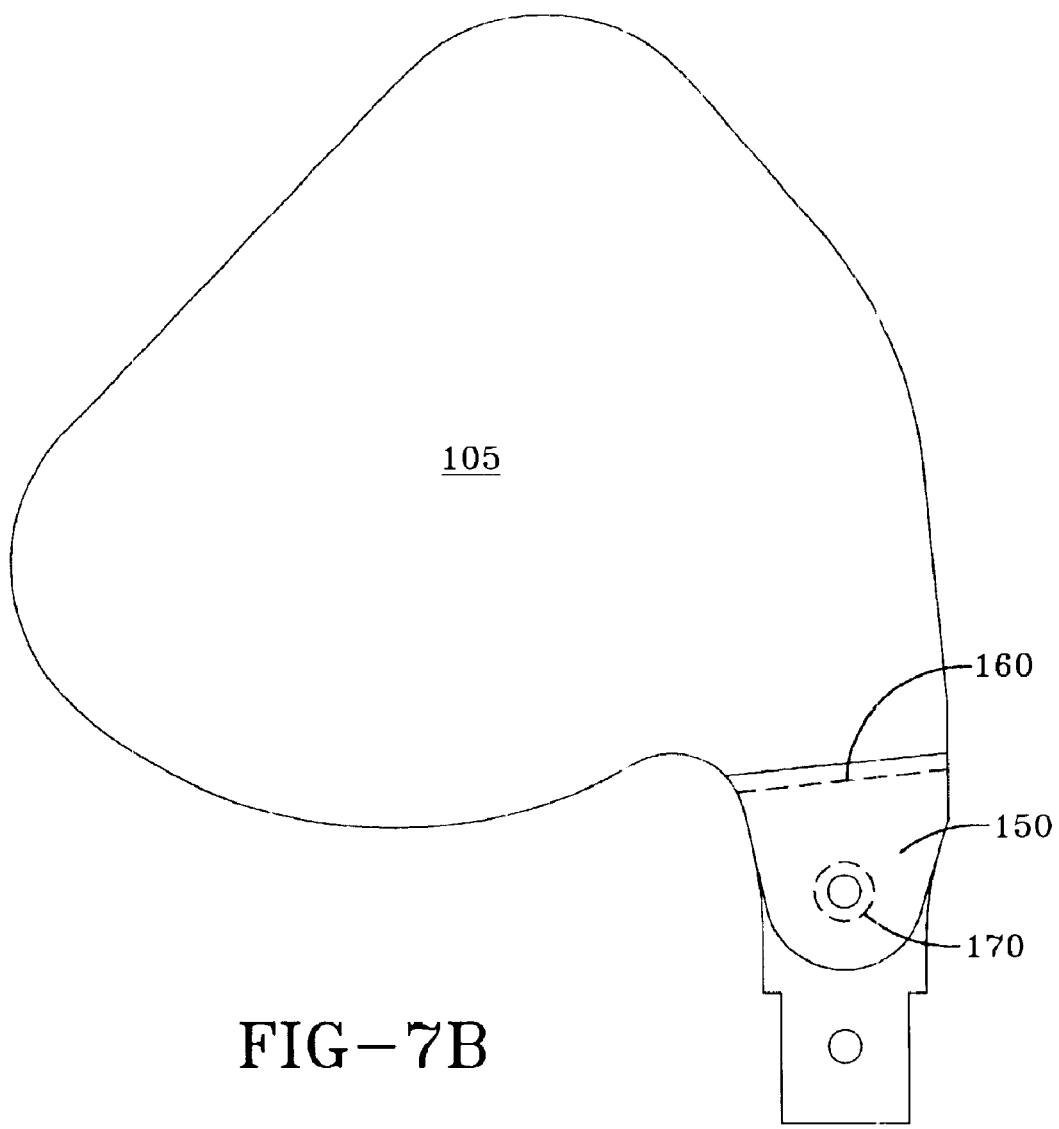
FIG. 7B illustrates the installation of a heat shield onto a side panel of the air bag.
Figure 8A:
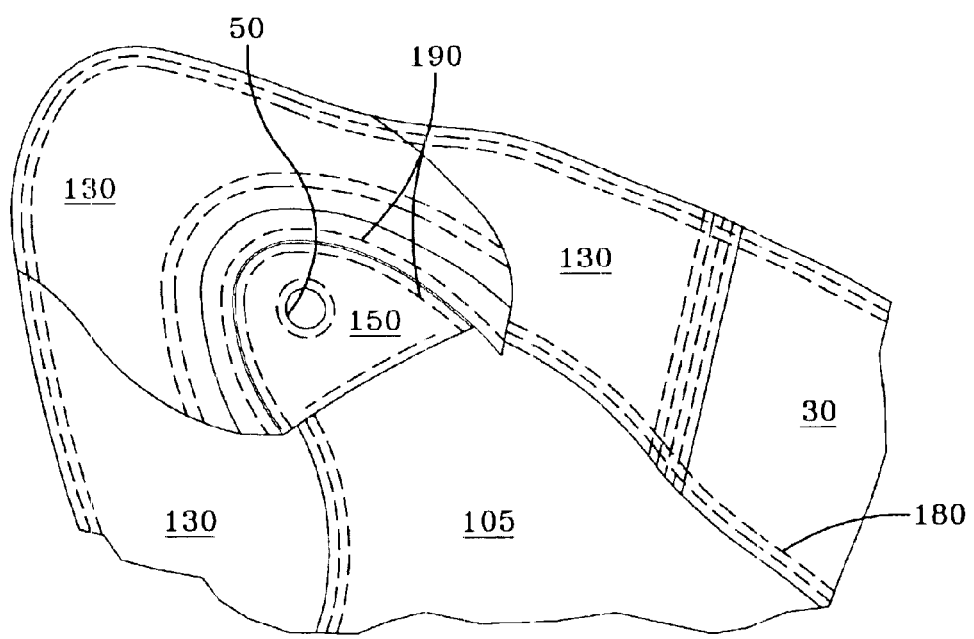
FIG. 8A illustrates the heat shield of FIGS. 6A–6C installed in the air bag module.

As shown in FIG. 6B, after heat shield 130 is folded down, stitch line 142 is added to hold heat shield 130 in place to neck 120. Then, heat shield 130 is folded upward across neck along the direction of arrow B to create another layer of insulation as illustrated in FIG. 6C. Another stitch line 144 is added to sew this layer of heat shield 130 to first neck 120. These layers are placed near the anticipated location of exit ports 82 of an inserted air bag inflator 18. Then, as shown in FIG. 7A, first neck 120 and second neck 124 are stitched together along with side panels 100 and 105 (not shown in FIG. 7A). FIG. 7B shows the attachment of secondary heat shield 150 onto side panel 105 using sew lines 160 and 170. FIG. 8A shows side panel 105 stitched together with main panel 30 using sew line 180. Above sew line 180, an additional sew line 190 is used to attached heat shield 130 to secondary heat shield 150 above sew line 190.

Figure 8B:
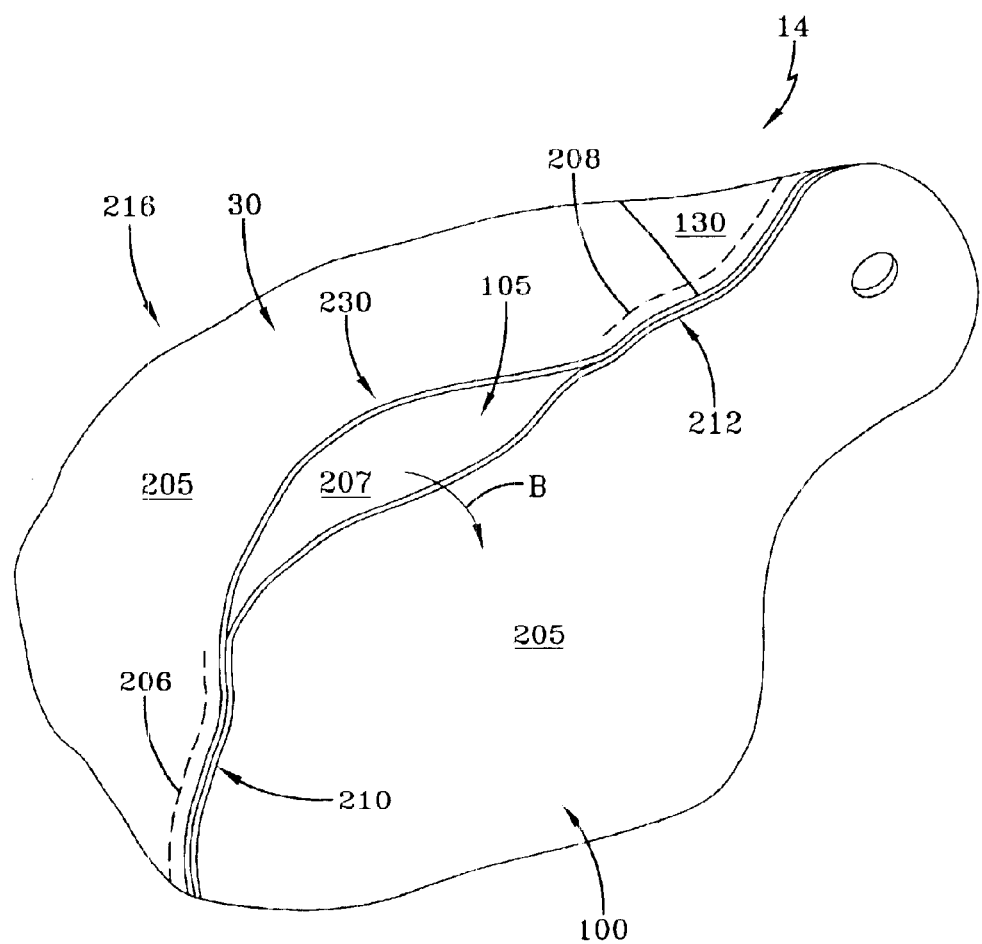
FIG. 8B illustrates the air bag having an inversion hole to permit the air bag to be sewn inside out.

As generally known, air bag 14 may be sewn with interior stitches (the air bag is sewn inside out). FIG. 8B illustrates air bag 14 as seen inside out. Normally, such as during air bag deployment, air bag 14 has surface 207 forming the outside surface of the air bag 14 while surface 205 forms the interior surface. As illustrated here, however, surface 205 is shown outside of surface 207 (inside out). This technique permits stitch lines to be hidden behind the seams of the air bag.

Stitch line 206 holds main panel 30 to side panel 100, to form seam 210 while stitch line 208 holds main panel 30 to side panel 100 to form seam 212. To assist in the manufacture of air bag 14, air bag 14 is sewn with gap 230 between seam 210 and seam 212. Side panel 105 (as seen through gap 230 between side panel 100 and main panel 30) is sewn to main panel 30 without a gap. Side panel 100, side panel 105, and main panel 30 form air bag volume 216 with surface 205 forming the exterior surface at this point. When air bag 14 is almost entirely sewn up, air bag volume 216 is turned outside out by pulling surface 207 through gap 230 along arrow B so that surface 207 now forms the exterior surface of air bag volume 216 and surface 205 forms the interior. Gap 230 is then sewn shut by stitch line 200 as shown in FIG. 9.

Figure 9:
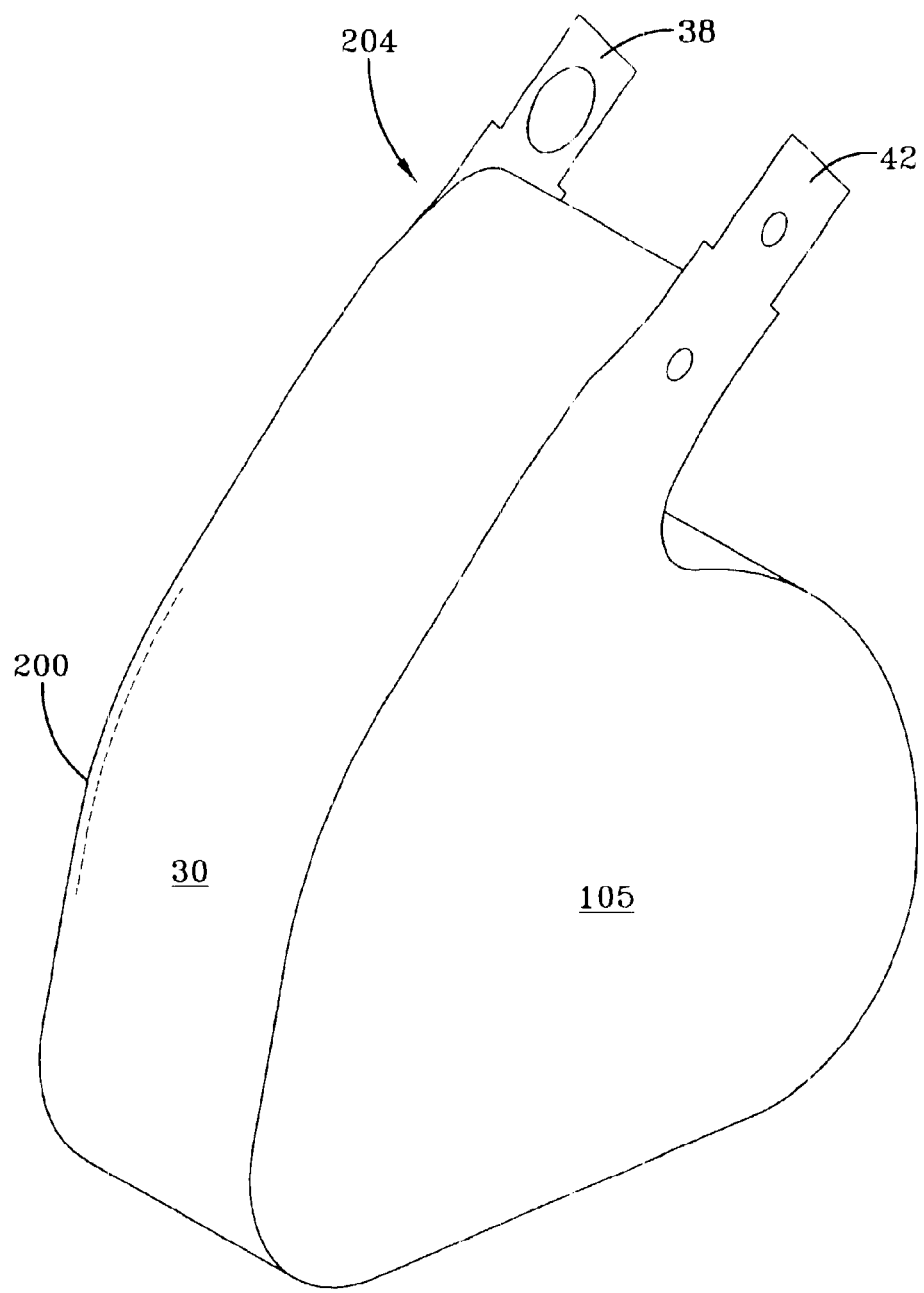
FIG. 9 illustrates the completed air bag module.

As shown in FIGS. 1 and 9, side panels 100, 105, and main panel 30 form end portion 204 to receive air bag inflator 18. Heat shields 130, 150 and reinforcement panels sewn to end portion 204, as shown in FIG. 8, serve to give end portion 204 a semi-rigid shape that enables end portion 204 to be placed within housing 24 and maintain its shape and location there. As a consequence, air bag inflator 18 may be more easily received by end portion 204.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air bag module, comprising:

an air bag inflator;

an air bag inflatable by said air bag inflator, said air bag having a first hole and a second hole therethrough, each of said holes sized to receive at least a portion of said air bag inflator; and a first tab located proximate said first hole and a second tab located proximate said second hole, said first tab foldable over at least a portion of said first hole and second tab foldable over at least a portion of said second hole, said first tab having a third hole and said second tab having a fourth hole wherein said third hole is sized to match said first hole and said fourth hole is sized to match said second hole.

2. The air bag module of claim 1 wherein said air bag inflator comprises a first end and a second end, said first end secured within said first hole and said third hole and said second end secured within said second hole and said fourth hole.

3. The air bag module of claim 1 including a housing wherein said housing has at least one opening to receive at least one tab.

4. An air bag module, comprising:

an air bag inflator;

an air bag inflatable by said air bag inflator, having at least one hole to receive said air bag inflator;

a least one tab attached to said air bag proximate said at least one hole; and a heat shield located within said air bag, wherein said heat shield comprises fabric sewn to said air bag.

5. The air bag module of claim 4 wherein said air bag has a seam, said heat shield covering said seam.

6. An air bag module, comprising:

an air bag inflator;

an air bag inflatable by said air bag inflator, having a first hole and a second hole, each of said holes sized to receive at least a portion of said air bag inflator;

at least one flap operatively attached to said air bag, said at least one flap securing said air bag inflator to said air bag; and a housing for protecting said air bag, said housing having at least one slot to receive said at least one flap.

7. The air bag module of claim 6 wherein said at least one flap comprises a first flap located proximate said first hole and a second flap located proximate said second hole, said first flap having a third hole and said second flap having a fourth hole wherein said third hole is sized to match said first hole and said fourth hole is sized to match said second hole.

8. The air bag module of claim 7 wherein said air bag inflator comprises a first end and a second end, said first end secured within said first hole and said third hole and said second end secured within said second hole and said fourth hole.

9. The air bag module of claim 6 including a heat shield within said air bag.

10. The air bag module of claim 9 wherein said heat shield comprises fabric sewn to said air bag.

11. The air bag module of claim 9 wherein said air bag has a seam, said heat shield covering said seam.

* * * * *